(12) United States Patent
Ash et al.

(10) Patent No.: US 9,785,561 B2
(45) Date of Patent: Oct. 10, 2017

(54) INTEGRATING A FLASH CACHE INTO LARGE STORAGE SYSTEMS

(75) Inventors: Kevin J. Ash, Tucson, AZ (US); Michael T. Benhase, Tucson, AZ (US); Evangelos S. Eleftheriou, Rueschlikon (CH); Lokesh M. Gupta, Tucson, AZ (US); Robert Haas, Rueschlikon (CH); Yu-Cheng Hsu, Tucson, AZ (US); Xiaoyu Hu, Rueschlikon (CH); Joseph S. Hyde, II, Tucson, AZ (US); Roman A. Pletka, Rueschlikon (CH); Alfred E. Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/707,357

(22) Filed: Feb. 17, 2010

(65) Prior Publication Data
US 2011/0202708 A1 Aug. 18, 2011

(51) Int. Cl.
| | | |
|---|---|---|
| *G06F 12/00* | (2006.01) | |
| *G06F 12/0866* | (2016.01) | |
| *G06F 13/00* | (2006.01) | |
| *G06F 13/28* | (2006.01) | |
| *G06F 3/06* | (2006.01) | |

(52) U.S. Cl.
CPC ........ *G06F 12/0866* (2013.01); *G06F 3/0611* (2013.01); *G06F 3/0655* (2013.01);
(Continued)

(58) Field of Classification Search
CPC ..... G06F 3/0611; G06F 3/0655; G06F 3/0685
(Continued)

(56) References Cited

U.S. PATENT DOCUMENTS

| 5,542,066 A | 7/1996 | Mattson et al. |
|---|---|---|
| 5,600,816 A | 2/1997 | Oldfield et al. |
| (Continued) | | |

FOREIGN PATENT DOCUMENTS

| CN | 1766857 A | 5/2006 |
|---|---|---|
| CN | 1823392 A | 8/2006 |
| (Continued) | | |

OTHER PUBLICATIONS

Peters, Mark; "NetApp's Solid State Hierarchy With a Focus on Flash Cache," Sep. 2009.*

(Continued)

*Primary Examiner* — Mark Giardino, Jr.
(74) *Attorney, Agent, or Firm* — Nelson and Nelson; Daniel P. Nelson; Alexis V. Nelson (57) ABSTRACT

An I/O enclosure module is provided with one or more I/O enclosures having a plurality of slots for receiving electronic devices. A host adapter is connected a first slot of the I/O enclosure module and is configured to connect a host to the I/O enclosure. A device adapter is connected to a second slot of the I/O enclosure module and is configured to connect a storage device to the I/O enclosure module. A flash cache is connected to a third slot of the I/O enclosure module and includes a flash-based memory configured to cache data associated with data requests handled through the I/O enclosure module. A primary processor complex manages data requests handled through the I/O enclosure module by communicating with the host adapter, device adapter, and flash cache to manage to the data requests.

2 Claims, 7 Drawing Sheets

(52) U.S. Cl.
CPC ...... *G06F 3/0685* (2013.01); *G06F 2212/214* (2013.01); *G06F 2212/2146* (2013.01)

(58) Field of Classification Search
USPC .................. 711/103, 113; 710/22; 714/2
See application file for complete search history.

(56) References Cited

U.S. PATENT DOCUMENTS

| | | | |
|---|---|---|---|
| 5,701,516 A * | 12/1997 | Cheng et al. | 710/22 |
| 6,199,179 B1 * | 3/2001 | Kauffman et al. | 714/26 |
| 6,467,022 B1 | 10/2002 | Buckland et al. | |
| 6,567,889 B1 | 5/2003 | DeKoning et al. | |
| 6,598,115 B2 | 7/2003 | Kaki et al. | |
| 6,625,705 B2 | 9/2003 | Yanai et al. | |
| 6,678,787 B2 | 1/2004 | Petruschka et al. | |
| 6,687,787 B1 | 2/2004 | Richardson et al. | |
| 7,000,083 B2 | 2/2006 | Jarvis et al. | |
| 7,076,606 B2 | 7/2006 | Orsley | |
| 7,149,846 B2 | 12/2006 | Hetrick | |
| 7,353,339 B2 | 4/2008 | Komarla et al. | |
| 7,421,552 B2 | 9/2008 | Long | |
| 7,549,018 B2 * | 6/2009 | Islam et al. | 711/114 |
| 7,610,438 B2 * | 10/2009 | Lee et al. | 711/103 |
| 7,634,585 B2 * | 12/2009 | Conley et al. | 710/1 |
| 7,640,381 B1 * | 12/2009 | Zhang et al. | 710/56 |
| 7,975,109 B2 | 7/2011 | McWilliams et al. | |
| 8,255,627 B2 | 8/2012 | Blinick et al. | |
| 2002/0073110 A1 | 6/2002 | Duvillier et al. | |
| 2002/0087815 A1 | 7/2002 | Arimilli et al. | |
| 2004/0225659 A1 | 11/2004 | O'Brien et al. | |
| 2005/0188279 A1 | 8/2005 | Gibble et al. | |
| 2006/0004957 A1 | 1/2006 | Hand, III et al. | |
| 2006/0184735 A1 * | 8/2006 | Hillman | 711/118 |
| 2007/0255898 A1 * | 11/2007 | Nishide et al. | 711/113 |
| 2008/0010502 A1 | 1/2008 | Baek et al. | |
| 2008/0091875 A1 | 4/2008 | Mannenbach et al. | |
| 2008/0098164 A1 | 4/2008 | Lee et al. | |
| 2008/0168234 A1 | 7/2008 | Gill et al. | |
| 2008/0244188 A1 * | 10/2008 | Yoshida | 711/137 |
| 2008/0250202 A1 | 10/2008 | Conley et al. | |
| 2009/0103203 A1 | 4/2009 | Yoshida | |
| 2009/0106518 A1 | 4/2009 | Dow | |
| 2009/0119353 A1 | 5/2009 | Oh et al. | |
| 2009/0125671 A1 | 5/2009 | Flynn et al. | |
| 2009/0216954 A1 | 8/2009 | Benhase et al. | |
| 2010/0146191 A1 * | 6/2010 | Katz | 711/103 |
| 2010/0174864 A1 | 7/2010 | Bar-El et al. | |
| 2011/0072194 A1 * | 3/2011 | Forhan et al. | 711/103 |
| 2011/0145473 A1 * | 6/2011 | Maheshwari | 711/103 |

FOREIGN PATENT DOCUMENTS

| | | |
|---|---|---|
| CN | 101276260 A | 10/2008 |
| GB | 2273798 A | 6/1994 |
| GB | 2273798A A | 6/1994 |
| WO | WO2007056669 A2 | 5/2007 |

OTHER PUBLICATIONS

Dufrasne, Bertrand et al., "DS8000: Introducing Solid State Drives," IBM Redpaper, 2009, updated on Jan. 15, 2010.

Fusion IO, "Review of the Fusion-IO IODrive 80 GB Solid State Drive (SSD)," www.dvnation.com/Fusion-IO-IODrive-SSD-Solid-State-Disk-Drive-Review.html (last accessed Nov. 23, 2010).

Texas Memory Systems, "Texas Memory Systems Announces RamSan-20," Mar. 10, 2009, www.hpcwire.com/offthewire/Texas-Memory-Systems-Announces-RamSan-20-41026272.html.

Gill, Binny S. et al., "SARC: Sequential Prefetching in Adaptive Replacement Cache," Apr. 2005, pp. 293-308, Proceedings of the USENIX Annual Technical Conference, USENIX Association.

Gill, Binny S. et al., "AMP: Adaptive Multi-stream Prefetching in a Shared Cache," Feb. 2007, Proceeding of the 5th USENIX Conference on File and Storage Technologies (FAST), USENIX Association.

Gill, Binny S. et al., "WOW: Wise Ordering for Writes—Combining Spatial and Temporal Locality in Non-Volatile Caches," Dec. 2005, pp. 129-142, Proceedings of the 4th USENIX Conference on File and Storage Technologies (FAST), USENIX Association.

Dufrasne, Bertran et al., "IBM System Storage DS8000: Architecture and Implementation," IBM Redbook, Oct. 2009, Eighth Edition.

Adam Leventhal, Flash Storage Memory, ACM Digital Library, vol. 51, No. 7, Jul. 2008.

Adam Leventhal, Flash Storage, ACM/Queue, Jul./Aug. 2008.

I.H. Doh, et al., Impact of NVRAM Write Cache for File System Metadata on I/O Performance in Embedded Systems, ACM Digital Library, Mar. 2009.

T. Kgil et al., Improving NAND Flash Based Disk Caches, International Symposium on Computer Architecture, IEEE, 2008.

H. Pon et al., A NAND Flash PC Platform Read Write Cache, IEEE, 2007.

Harry Pon, NAND Flash Read/WRite Cache Directions for the Personal Computing Platform, IEEE, 2008.

Cantrill, et al., "Enterprise Flash Storage," ACM Queue, Association for Computing Machinery, Jul./Aug. 2008, pp. 16-30, 32, 34-39, and 41-52, New York, NY, USA.

Office Action, Chinese Patent Office, Application No. 201180009703.5, Jun. 23, 2014.

"Method and Apparatus for Combining Use of Magnetic Hard Drives and Solid State Disks For Optimal Performance and Lifespan", Author: IBM, Source: www.ip.com, Date: Feb. 2009, IP.com. No. IPCOM000179606D.

"Providing Solid State Disk Capability in a Storage Controller", Author: IBM, Source: www.ip.com, Sep. 2003, IP.com No. IPCOM000019207D.

"Multiple Solid State Memory Partitions Within Solid State Tape Cartridge With Data Cable", Author: IBM, Source: www.ip.com, Date: Mar. 2009, IP.com No. IPCOM000180818D.

PCT International Search Report and Written Opinion, International Application No. PCT/EP2010/064816, Feb. 22, 2011.

IBM Technical Disclosure Bulletin; "Load Balancing of Destage Operation in a N way Cache Disk Subsystem"; IBM Corporation, pp. 1-6, Mar. 1, 2001.

IBM Corporation; "The IBM TotalStorage DS8000 Series: Concepts and Architecture"; Apr. 2005.

"Method and Apparatus for Combining Use of Magnetic Hard Drives and Solid State Disks for Optimal Performance and Lifespan", Author: IBM, Source: www.ip.com, Date: Feb. 2009, IP.com No. IPCOM000179606D.

* cited by examiner

Prior Art

INTEGRATING A FLASH CACHE INTO LARGE STORAGE SYSTEMS

BACKGROUND

1. Field of the Invention

This invention relates to storage systems and more particularly relates to integrating a flash-based cache into large storage systems.

2. Description of the Related Art

The advent of flash-based solid-stage drives ("SDDs") is revolutionizing primary storage computer architecture, ranging from notebooks to enterprise storage systems. Flash-based SSDs provide random I/O performance and access latencies that are orders of magnitude better than that of rotating Hard-disk Drives ("HDDs"). Additionally, flash-based SSDs have significantly reduced power consumption.

Flash-based memory extension cards are emerging as tools for memory expansion and improvement, even in network environments. Typically, these extension cards are placed directly into hosts using PCI-e slots, thereby placing the cards closer to the processor of the host than to the storage disks accessed by the host via a network. Placing the extension cards closer to the processor prevents additional latencies from disk array controllers and network protocols.

Even though flash-based SSDs and flash-based memory extension cards provide random I/O performance and access latency that are orders of magnitude better than that of HDDs, the random read/write I/O performance heavily depends on the architecture of the solid-state memory controller associated with a device. For example, as noted, read and write latencies are typically two orders of magnitude lower for flash-based SSDs than HDDs, but the latency to the DRAM cache in large storage systems, such as enterprise storage systems that use HDDs for storage, is still two orders of magnitude better than flash-based SSDs.

The overall system performance in terms of I/O Operations Per Second ("IOPS") and latency not only depends on the internal architecture of the solid-state memory controller, but also heavily depends on the overall system architecture, such as how a flash-based memory extension is integrated into a system and what interfaces are provided.

Figure 1:
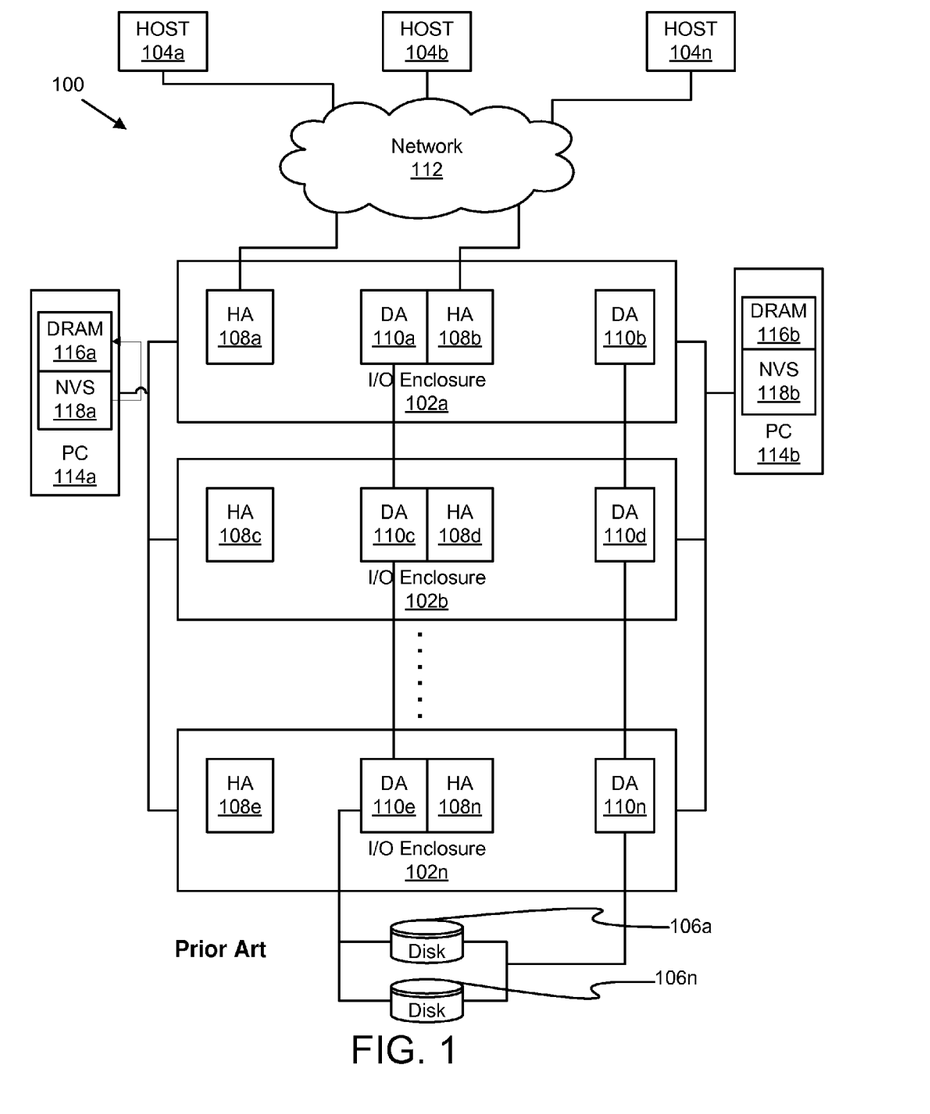
FIG. 1 is a schematic block diagram illustrating one embodiment of a conventional storage system in accordance with the present invention.

FIG. 1 is a schematic block diagram illustrating one embodiment of a conventional storage system 100 in accordance with the prior art. The system 100 includes a plurality of I/O enclosures 102a-n that provide an interface between one or more hosts 104a-n and one or more storage devices 106a-n. The storage devices 106a-n may be housed in an enclosure such as a disk enclosure that houses one or more HDDs.

An I/O enclosure as used herein refers to a device that houses various I/O adapters and connectivity devices to provide communication between I/O storage unit processors and the I/O adapters. Typically, I/O enclosures 102a-n are installed in pairs to provide redundancy protection. The I/O adapters contained in an I/O enclosure are typically either a host adapter 108a-n or a device adapter 110a-n. An I/O enclosure has a plurality of available slots to which a host adapter 108a-n or a device adapter 110a-n may be attached. However, in many cases an I/O enclosure is left with several open slots for expansion or other uses.

A host adapter 108a-n is an adapter that provides connectivity between a host 104a-n and the I/O enclosure 102a-n. The hosts 104a-n typically connect to the host adapters 108a-n across a network 112 which comprises various devices such as routers, switches, and the like. The hosts 104a-n typically connect to a host adapter 108a-n using network technology such as Fibre Channel, Fibre Connectivity ("FICON"), Enterprise Systems Connection ("ESCON") or other connectivity protocol as recognized by those of skill in the art. A device adapter 110a-n is a device that provides connectivity between a device, such as a storage device 106a-n and the I/O enclosure 102a-n. In one embodiment, the device adapters 110a-n may be Fibre Channel arbitrated loop ("FC-AL") device adapters. In a typical embodiment, each device adapter 110a-n may connect to two separate switched networks that provide communication to the storage devices 106a-n. When a device adapter 110a-n connects to a storage device 106a-n, it may then use a switched connection to transfer data through the shortest possible path.

Communication between the various components of the system 100 is facilitated by one or more processor complexes 114a-b. In a common architecture implemented in typical enterprise storage systems, two processor complexes 114a-b are utilized to increase reliability and to improve performance. A processor complex 114a-b is typically connected to each I/O enclosure 102a-n and includes the logic necessary to provide communication between host adapters 108a-n and device adapters 110a-n thereby enabling a host 104a-n connected to a host adapter 108a-n to access a storage device 106a-n via a device adapter 110a-n. A processor complex 114a-n may also be referred to herein as a central electronics complex ("CEC").

In conventional systems, the processor complex typically includes a volatile memory such as dynamic random access memory ("DRAM") 116a-b and a non-volatile memory called non-volatile storage ("NVS") 118a-b that is typically configured as battery-backed DRAM. The memory 116, 118 of the processor complexes are typically used to cache data associated with data requests handled via the system 100.

In operation, read and write requests from the hosts 104a-n are first handled by a host adapter 108a-n, which in turn interacts with a processor complex 114a. The processor complex 114a manages all read and write requests to the logical volumes of the storage devices 106a-n. During write requests, the processor complex 114a may use fast-write, in which the data is cached to the volatile memory 116a of one processor complex 114a and is also written to the persistent memory 118b of the other processor complex 114b. The processor complex 114a may then report the write as complete even before it has actually been written to disk. This provides fast write latency. However, size, time, and power restrictions may limit the effectiveness of the processor complex memories 116, 118 when used as a data cache.

When a host 104a-n performs a read operation, a processor complexes 114a-b fetches the data from the storage devices 106a-n using the high performance switched network architecture. When data is fetched and returned to a host 104a-n, the data may also be cached into the volatile memory 116a-b in case it is required again in a future read request. In one embodiment, the processor complexes 114a-b attempt to anticipate future reads by using algorithms such as sequential pre-fetching in adaptive replacement cache ("SARC"). Data is held in the cache as long as possible using such algorithms. If a cache hit occurs where requested data is already in the cache, then the host 104a-n does not have to wait for it to be fetched from the storage devices 106a-n. However, due to the size, time, and power limitations of the processor complex memories 116, 118, the caching ability of those memories may not be satisfactory in all cases.

BRIEF SUMMARY

From the foregoing discussion, it should be apparent that a need exists for an apparatus, system, and method that improve on current storage architectures and data caching systems. Beneficially, such an apparatus, system, and method would integrate flash-based memory devices into one or more free slots of an I/O enclosure to provide caching and storage capabilities that improve upon the architecture and caching abilities known in the prior art.

The present invention has been developed in response to the present state of the art, and in particular, in response to the problems and needs in the art that have not yet been fully solved by currently available storage system architectures. Accordingly, the present invention has been developed to provide an apparatus, system, and method for integrating a flash cache into large storage systems that overcome many or all of the above-discussed shortcomings in the art.

The apparatus to integrate a flash-based cache is provided with a plurality of modules and devices. These modules and devices in the described embodiments include an input/output ("I/O") enclosure module, a host adapter, a device adapter, a flash-based caching device ("flash cache"), and a primary processor complex.

The I/O enclosure module includes one or more I/O enclosures having a plurality of slots for receiving electronic devices. The host adapter is connected a first slot of the I/O enclosure module and is configured to connect a host to the I/O enclosure. The device adapter is connected to a second slot of the I/O enclosure module and is configured to connect a storage device to the I/O enclosure module. The flash cache is connected to a third slot of the I/O enclosure module and includes a flash-based memory configured to cache data associated with data requests handled through the I/O enclosure module. The primary processor complex manages data requests handled through the I/O enclosure module by communicating with the host adapter, device adapter, and flash cache to manage to the data requests.

In one embodiment, the primary processor complex further comprises a dynamic random access memory ("DRAM") cache for temporarily caching data associated with data requests handled through the I/O enclosure. In a further embodiment, the primary processor complex further comprises a non-volatile storage ("NVS") cache that includes a non-volatile memory device for caching data associated with data request handled by the I/O enclosure. In one embodiment, the primary processor complex is configured to de-stage data cached in one of the DRAM cache and NVS cache to the flash cache.

The apparatus is further configured, in one embodiment, to include a secondary processor complex that acts as a secondary manager of data requests handled through the I/O enclosure module such that the secondary processor complex communicates with the host adapter, device adapter, and flash cache to manage data requests in response to a failure of the primary processor complex. In a further embodiment, the second processor complex includes a DRAM cache for temporarily caching data associated with data requests handled by the I/O enclosure. In yet a further embodiment, the second processor complex further comprises an NVS cache comprising a non-volatile memory device for caching data associated with data requests handled by the I/O enclosure.

In one embodiment, the flash cache is assigned to exactly one of the primary processor complex and a secondary processor complex, wherein both the primary processor complex and secondary processor complex are configured to manage data requests handled through the I/O enclosure. In a further embodiment, the at least one flash cache first assigned to the primary processor complex is re-assigned to the secondary processor complex in response to a failure of the primary processor complex.

In one embodiment of the apparatus, the flash cache is divided into regions comprising a read cache region that caches data associated with read data requests and a write cache region that caches data associated with write data requests. In a further embodiment, the flash cache is further divided into a supplemental read cache region that maintains a cache of data already de-staged to a storage device such that the data can be retrieved from the supplemental read cache region and a store region that stores data that is not de-staged to a storage device such that the data is retrieved from the store region.

In one embodiment, the primary processor complex is configured to exclusively utilize the flash cache for caching operations handled through the I/O enclosure module such that a separate DRAM cache and/or NVS cache is not used by the primary processor complex for caching operations.

A system of the present invention is also presented to integrate a flash-based cache into a storage system. The method in the disclosed embodiments substantially includes the steps necessary to carry out the functions presented above with respect to the operation of the described apparatus. The system may be embodied in various configurations to incorporate a flash cache into an extra slot of an I/O enclosure.

In particular, the system, in one embodiment, includes an I/O enclosure module with one or more I/O enclosures having a plurality of slots for receiving electronic devices. It preferably has at least one host adapter connected to a first slot of the I/O enclosure module, the host adapter configured to connect a host to the I/O enclosure module. At least one host is connected to the at least one host adapter. At least one device adapter is connected to a second slot of the I/O enclosure module, and the device adapter is configured to connect a storage device to the I/O enclosure module.

The system also includes at least one storage device connected to the at least one device adapter. The system further includes at least one flash-based caching device ("flash cache") connected to a third slot of the I/O enclosure module. The flash cache includes a flash-based memory configured to cache data associated with data requests handled through the I/O enclosure module. The system may also include a primary processor complex that manages data requests handled through the I/O enclosure module. The primary processor complex communicates with the at least one host adapter, the at least one device adapter, and the at least one flash cache to manage the data requests.

In one embodiment of the system, the host is a computer system wherein the computer system includes at least a processor and memory. In a further embodiment, the storage device includes one or more of a hard disk drive and a magnetic tape drive.

A method of the present invention is also presented for integrating a flash-based cache into a storage system. The method in the disclosed embodiments substantially includes the steps necessary to carry out the functions presented above with respect to the operation of the described apparatus and system.

In one embodiment, the method includes connecting at least one flash-based caching device ("flash cache") to an I/O enclosure module, the flash cache comprising a flash-based memory configured to cache data associated with data requests handled through the I/O enclosure module. The method may also include receiving a data request at a host adapter connected to a first slot of an I/O enclosure module. The host adapter is configured to connect a host to the I/O enclosure module. The I/O enclosure module includes one or more I/O enclosures having a plurality of slots for receiving electronic devices, and the I/O enclosure module has at least one device adapter connected to a second slot of the I/O enclosure module. The device adapter is configured to connect a storage device to the I/O enclosure module.

The method also may include communicating the data request to a primary processor complex that manages data requests handled through the I/O enclosure module, and accessing at least one flash-based caching device ("flash cache") to perform one or more caching operations associated with the data request. The flash cache is connected to a third slot of the I/O enclosure module. The flash cache includes a flash-based memory configured to cache data associated with data requests handled through the I/O enclosure module.

In a further embodiment of the method, the data request may be a read request, and accessing the at least one flash cache to perform one or more caching operations may include retrieving data from the flash cache. In another embodiment, the data request may be a write request, and accessing the at least one flash cache to perform one or more caching operations may include storing data associated with the write request in the flash cache. In a further embodiment, the method may further include de-staging data stored in the flash cache to the storage device connected to the device adapter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Figure 2:
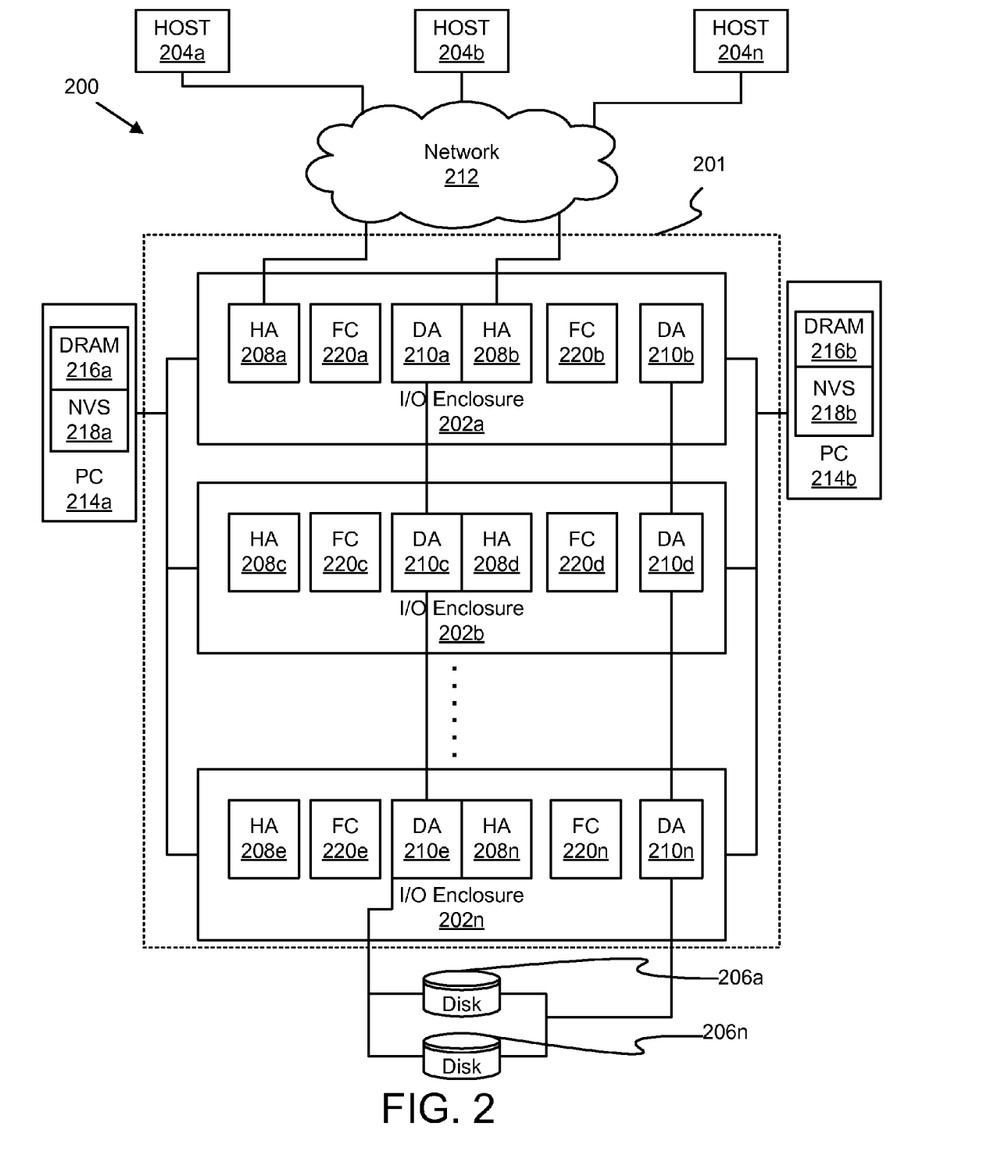
FIG. 2 is a schematic block diagram illustrating one embodiment of a storage system with an integrated flash-based cache in accordance with the present invention.

FIG. 2 is a schematic block diagram illustrating one embodiment of a storage system 200 with an integrated flash-based caching device ("flash cache") 220a-n in accordance with the present invention.

The system 200 includes a set of one or more I/O enclosures 202a-n that provide an interface between one or more hosts 204a-n and one or more storage devices 206a-n. The storage devices 206a-n may be housed in an enclosure such as a disk enclosure that houses one or more HDDs or other types of storage devices such as magnetic tape drives or optical drives. In one embodiment, the storage devices 206a-n may include an array of disks that may be configured to provide various types of redundancy protection.

As used herein the set of I/O enclosures may be referred to collectively as an I/O enclosure module 201. An I/O enclosure 202a-n as used herein refers to a device that houses various I/O adapters 208a-n, 210a-n and connectivity devices to provide communication between I/O storage unit processors 214a-b and the I/O adapters 208a-n, 210a-n. Typically, I/O enclosures 102a-n are installed in pairs to provide redundancy protection. The I/O adapters 208a-n, 210a-n contained in an I/O enclosure 202a-n are typically one of either a host adapter 108a-n or a device adapter 210a-n. An I/O enclosure 202a-n typically has a plurality of available slots to which a host adapter 208a-n or a device adapter 210a-n may be attached. However, as noted above, an I/O enclosure 202a-n may be configured with several open slots for expansion of adapters or for other uses.

A host adapter 208a-n is an adapter that provides connectivity between a host 204a-n and the I/O enclosure 202a-n. A host 204a-n is typically a computing machine such as a personal computer, laptop, client or the like that accesses the storage system 200 by making data requests through the I/O enclosure 202a-n to various storage devices 206a-n or subsystems. The hosts 204a-n typically connect to the host adapters 208a-n across the network 212, and the network 212 usually includes various devices such as routers, switches, and the like. The hosts 204a-n may connect to a host adapter 108a-n using network technology such as Fibre Channel, Fibre Connectivity ("FICON"), Enterprise Systems Connection ("ESCON") or other connectivity protocol as recognized by those of skill in the art.

A device adapter 210a-n is a device that provides connectivity between a device, such as a storage device 206a-n and the I/O enclosure 202a-n. In one embodiment, the device adapters 210a-n may be Fibre Channel arbitrated loop ("FC-AL") device adapters. In a typical embodiment, each device adapter 210a-n may connect to two separate switched networks that provide communication to the storage devices 206a-n. In one embodiment, when a device adapter 210a-n connects to a storage device 206a-n, it may then use a switched connection to transfer data through the shortest possible path. Of course, other types of connections and communication protocols as recognized by those of skill in the art are contemplated.

Communication between the various components of the system 200 is facilitated by one or more processor complexes 214a-b. In a common architecture implemented in typical enterprise storage systems, two processor complexes 214a-b are utilized to increase reliability and to improve performance. Usually one is the primary processor complex 214a and the other is the secondary processor complex 214b. Both processor complexes 214a-b are typically connected to each I/O enclosure 202a-n and include the logic necessary to provide communication between host adapters 208a-n and device adapters 110a-n thereby enabling a host 204a-n connected to a host adapter 208a-n to access a storage device 206a-n via a device adapter 210a-n. A processor complex 214a-n may also be referred to herein as a central electronics complex ("CEC").

In the depicted embodiment, the processor complex 214a-b includes a volatile memory such as dynamic random access memory ("DRAM") 216a-b and a non-volatile memory called non-volatile storage ("NVS") 218a-b that is typically configured as battery-backed DRAM. Of course, in other embodiments, other types of volatile memory and non-volatile memory may be utilized by the processor complex as will be recognized by those of skill in the art. The memory 216, 218 of the processor complexes 214a-b is typically used to cache data associated with data requests handled by the system 200.

In accordance with the present invention, the system 200 incorporates a flash cache 220a-n into a free slot of the I/O enclosure module 201. Preferably, a plurality of flash caches 220a-n may be utilized and each flash cache 220a-n may be assigned to a particular processor complex 214a-b. The flash cache 220a-n includes a flash-based memory configured to cache data associated with data requests handled through the I/O enclosure module 201. In a contemplated embodiment, "flash-based" memory may refer to other types of solid-state memories such as phase change memory ("PCM") which may have similar properties to flash memory, but which may have improved performance properties depending on the configuration and architecture of the system 200. Additionally, in some embodiments, a flash cache 220a could be divided into two or more partitions, which can each be managed by one of the processor complexes 214a-b. This would enable less flash caches 220a-n to be used, thereby reducing the overall cost. In such an embodiment, data redundancy may be provided in a second flash cache 220c on a second I/O enclosure 202b.

By integrating a flash cache 220a-n into a free slot of the I/O enclosure module 201, the flash cache 220a-n improves the performance (e.g. better cache hit rate) of the system 200 while seamlessly integrating with existing architectures without significant modifications to the devices and components of the system 200. Furthermore, the flash cache 220a-n is scalable and can grow significantly larger than the DRAM cache 216a-b and NVS cache 214a-b of conventional systems.

In the depicted embodiment, the flash cache 220a-n operates as an intermediate cache and operates in conjunction with the DRAM cache 216a-b and NVS cache 218a-b to form a two-layer caching system. For example, data may be cached first in the DRAM cache 216a-b and then de-staged to the flash cache 220a-n before being further de-staged to the storage devices 206a-n. This enables enhancement of the architecture with at least the same performance characteristics in terms of instructions per second and latency while enlarging the available cache to improve on the cache hit rate.

Figure 3:
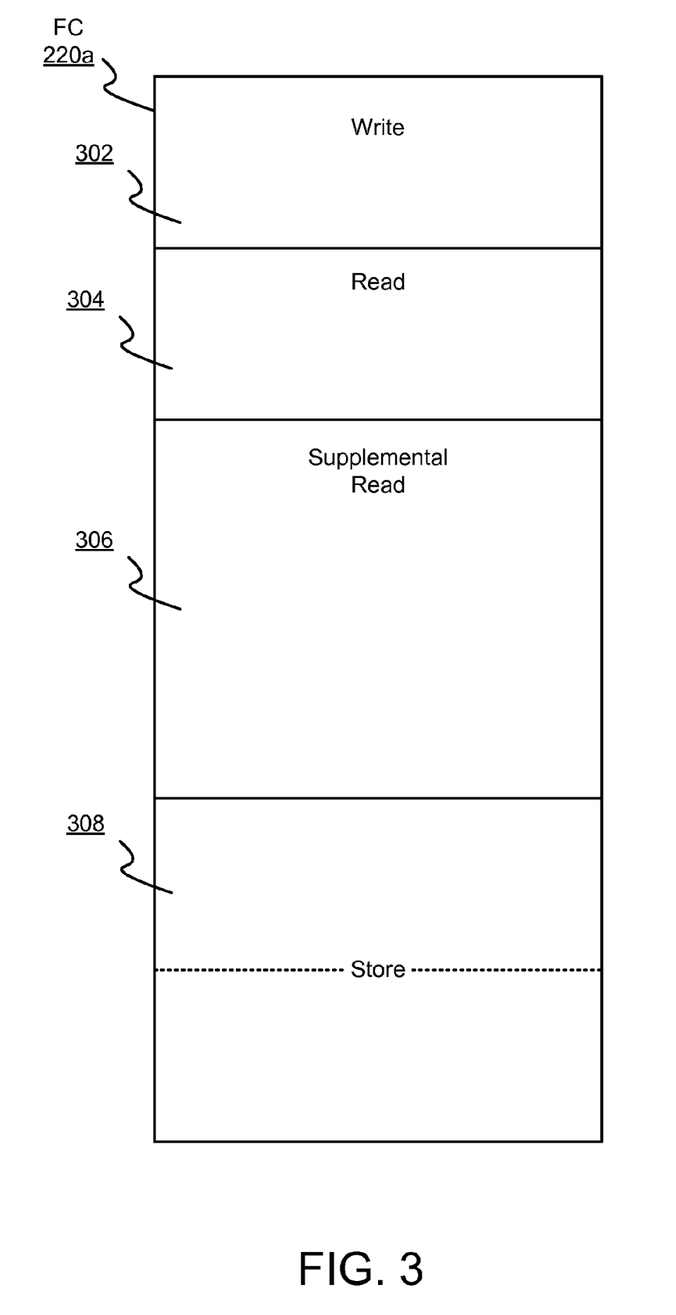
FIG. 3 is a schematic block diagram illustrating one embodiment of a flash-based caching device in accordance with the present invention.

FIG. 3 is a schematic block diagram illustrating one embodiment of a flash-based caching device 220a, or flash cache, in accordance with the present invention. As shown, the flash cache 220a may be divided into different regions for handling different caching operations. The depicted embodiment shows a write region 302, a read region 304, a supplemental read region 306, and a store region 308. Although the depicted embodiment shows four different regions, it is contemplated that a flash cache 220a may be provided with as few as one different region type. Generally, the read region 304 is used to keep a mirrored data copy where the other copy either resides in a DRAM cache 216a, NVS cache 218a, or flash cache 220a, whereas the supplemental read region 306 holds cached data which is not required to be mirrored in another cache. In a preferred embodiment, the management of the read region 304 is controlled by one of the processor complexes 214a-b and the management of the supplemental read region 306 is done internally by the flash cache 200a-n.

The write region 302 is configured to temporarily store data associated with a write request. Typically, the write data is de-staged to either a storage device 206a-n or to a read region of the flash cache 220a. The read region 304 stores data for read requests such that the data need not be retrieved from the storage devices 206a-n, and instead is retrieved directly from the read region 304 of the flash cache. Preferably, the read region 304 is directly accessible by a host adapter 208a-n in the same I/O enclosure 202a-n as the corresponding flash cache 220a-n. The supplemental read region 306 acts to expand the read region memory available to increase the likelihood of a cache hit on a read request.

The store region 308 is preferably configured to act similarly to a tier-0 storage device. For example, the store region 308 may be used to store data that is never de-staged to disks such as meta-data used by the processor complexes 214a-b or data that is preferably stored on a flash cache 220a-n. In one embodiment, the store region 308 of the flash cache 220a may be assigned a logical unit number ("LUN") for accessing the region as a storage device.

In some embodiments, data stored in the store region 308 of a flash cache 220a may be mirrored in the store region of another flash cache 220b to provide redundancy protection. Thus, a write request may store data in the store region of a first flash cache 220a and the store region of a second flash cache 220c. Preferably, the first and second flash caches 220a, 220c are located in different I/O enclosures 202a-n. Subsequent, read request may then retrieve the data directly from the store region of the flash caches 220a 220c. Preferably, a read request received by a host adapter 208a will retrieve data from a flash cache 220a configured within the same I/O enclosure 202a as itself.

In operation, the system 200 with a processor complex cache 216a-b, 218a-b and a flash cache 220a-n, handles both read and write requests in an improved manner.

With regard to a write request, a write request is received by a host adapter 208a, and the host adapter 208a asks the primary processor complex 214a where to store the data. The processor complex 214a sends back a response indicating a location where the data should be moved to. Typically, the processor complex responds with two locations, a volatile DRAM cache 216a location and a non-volatile location in either the NVS cache 218b of the secondary processor complex 214b or one or two locations in write regions of the flash caches 220a-n. In one embodiment, if the primary processor complex 214a is not reachable, the secondary processor complex 214b can be asked, and the secondary processor complex 214b becomes the new primary processor complex 214a.

The primary processor complex 214a will respond to a write request by allocating space in its DRAM cache 216a. Typically, space in the NVS cache 218b of the secondary processor complex 214b will also be allocated to act as a backup of the cached data. The host adapter 208a then transfers the data to the locations indicated by the primary processor complex 214a including the DRAM cache 216a and the NVS cache 218b.

Later on, the processor complex 214a-b may then de-stage the data from the DRAM cache 216a and the NVS cache 218b to the flash cache 220a-n. The processor complex 214a-b may then de-stage data from the flash cache 220a-n to the storage devices 206a-n. To do so, a device adapter 210a is informed, and the device adapter 210a de-stages the data from the flash cache 220a-n to a storage device 206a-n attached to the device adapter 210a. Preferably, a device adapter 210a-n in the same I/O enclosure 202a-n where the data is stored on the flash cache 220a-n is used. In some cases, data may be de-staged directly from the DRAM cache 216a or NVS cache 218b directly to the storage device 206a-n. Once the de-staging operation is complete, the device adapter 210a informs the processor complex 214a of the completion of the operation.

Once the data is de-staged from the flash cache 220a-n to the storage devices 206a-n, the primary processor complex 214a can either release the data in the write region 302 of the flash cache 220a-n or virtually move it to a supplemental read region 306 of the flash cache 220a for future access in accordance with read requests that request the same data. This allows the flash cache 220a-n to invalidate internal mapping entries, thereby reducing write amplifications. Once this is done, a completion message is sent from the flash cache 220a-n to the processor complex 214a.

In one embodiment, moving data from one cache region (e.g. write region 302) to another (e.g. supplemental read region 306) does not require an actual re-copying of the data. Instead, meta-data associated with the flash cache 220a-n is updated to reflect the region change of the data. In the case of a failure of the primary processor complex 214a, the meta-data information may be dumped to the NVS cache 218a-b of the secondary processor complex 214b or to the flash cache 220a-n itself (e.g. in the store region 308). Then, the secondary processor complex 214b may take over, retrieve the meta-data from either its NVS cache 218b or the flash cache 220a-n, and then proceed with normal operation.

With regard to a read request, the host adapter 208a receives the read request and asks the processor complex 214a for the location of the requested data. One or more of the processor complexes 214a-b responds with the location of the data, which can be either in its local DRAM cache 216a-b, its NVS cache 218a-b, one of the regions of the flash cache 220a-n assigned to the processor complex 214a-b, or on a storage device 206a-n connected to the system 200. The host adapter 208a then fetches the data from the identified location and provides it to the host 204a-n. In some cases, data my not yet have been moved from the write region 302 of the flash cache to the read regions 304, 306. Nevertheless, in such a case, the data may still be retrieved directly from the write region 302 if needed. If data is retrieved from one of the storage devices 206a-n, then a device adapter 210a-n is typically utilized by the processor complex 214a-b to retrieve the data.

Figure 4:
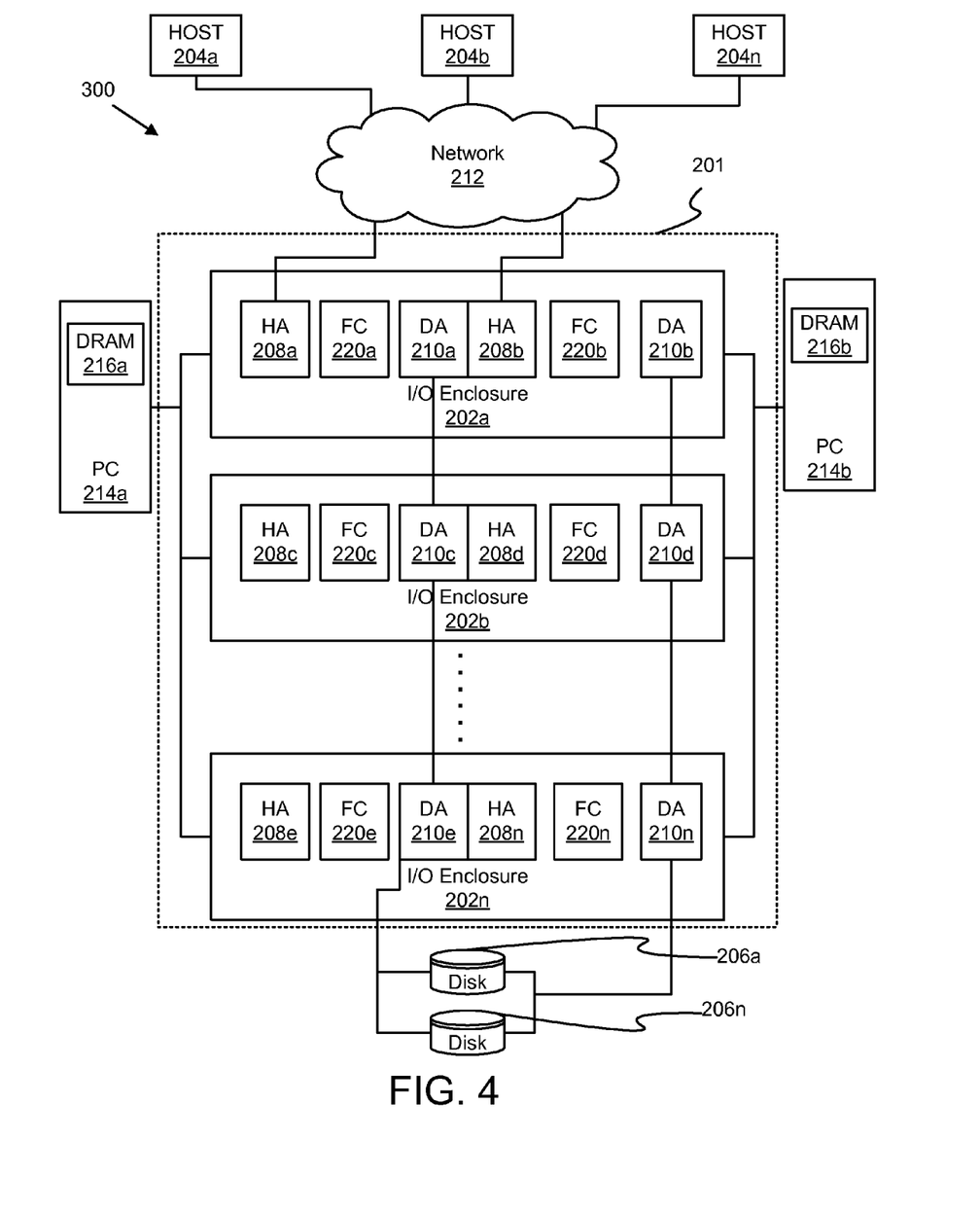
FIG. 4 is a schematic block diagram illustrating one embodiment of a storage system with an integrated flash-based cache and without a non-volatile storage cache in accordance with one embodiment of the present invention.

FIG. 4 is a schematic block diagram illustrating one embodiment of a storage system 300 with an integrated flash-based cache 220a-n and without an NVS cache 218a-b in accordance with one embodiment of the present invention. In this embodiment, various flash caches 220a-n are still placed into free slots of the I/O enclosure module 201, but the NVS caches 218a-b typically attached to the processor complexes 214a-b are removed. In this embodiment, the flash cache 220a-n acts as the non-volatile storage for the processor complexes 214a-b such that cost can be reduced and efficiency increased by avoiding the need to provide power to the NVS cache 218a-b. Furthermore, less fabric bandwidth is consumed compared to an embodiment that includes the NVS cache 218a-b while still providing a scalable write cache in the form of the flash cache 220a.

The operation of the system 300 also differs somewhat because the NVS cache 218a-b is removed from the system 300. With regard to a write request, the host adapter 208a again asks the primary processor complex 214a where to cache the write data, and the primary processor complex 214a responds by allocating space in its DRAM cache 216a and in the write region 302 of a flash cache 220a. The data is written to both locations, with the flash cache 220a now acting to provide the non-volatile storage of the write data instead of the NVS cache 218b, and the DRAM cache 216a acting to provide increased storage performance as compared to the flash cache 220a.

In one embodiment, the data is de-staged to the storage devices 206a-n directly from the DRAM cache 216a. Accordingly, the flash cache 220a-n may release the write data from its write region 302. In one embodiment, the data is moved from the write cache region 302 into the supplemental read region 306 (or the read region 304), by updating the meta-data associated with the flash cache 220a. Completion of this action is then signaled back to the processor complexes 214a-b. Alternatively, the data may be de-staged from one flash cache 220a to another flash cache 220c prior to de-staging the data to the storage devices 206a-n. For example, a second flash cache 220c acts as a second layer intermediate cache between a first flash cache 220a and the storage devices 206a-n.

Because, at least one copy of the data is stored in a flash cache 220a-n, additional intelligence may be needed to hide the significantly higher write latency associated with flash-based memory as opposed to DRAM. This may be achieved in one embodiment by using a ring buffer in the flash cache that is either battery-backed or protected with super capacitors. Once data has been transferred into this ring buffer the flash cache can immediately acknowledge the successful write operation before the data is actually moved into the flash memory. Typically, the ring buffer is relatively small as compared to the NVS cache 218a-b so as to save power and cost and may be separate from meta-data holding structures associated with the flash cache 220a-n.

The read path corresponds to the one described above with regard to FIG. 2 except that the NVS cache 218a-b is no longer available as a possible read data location.

Figure 5:
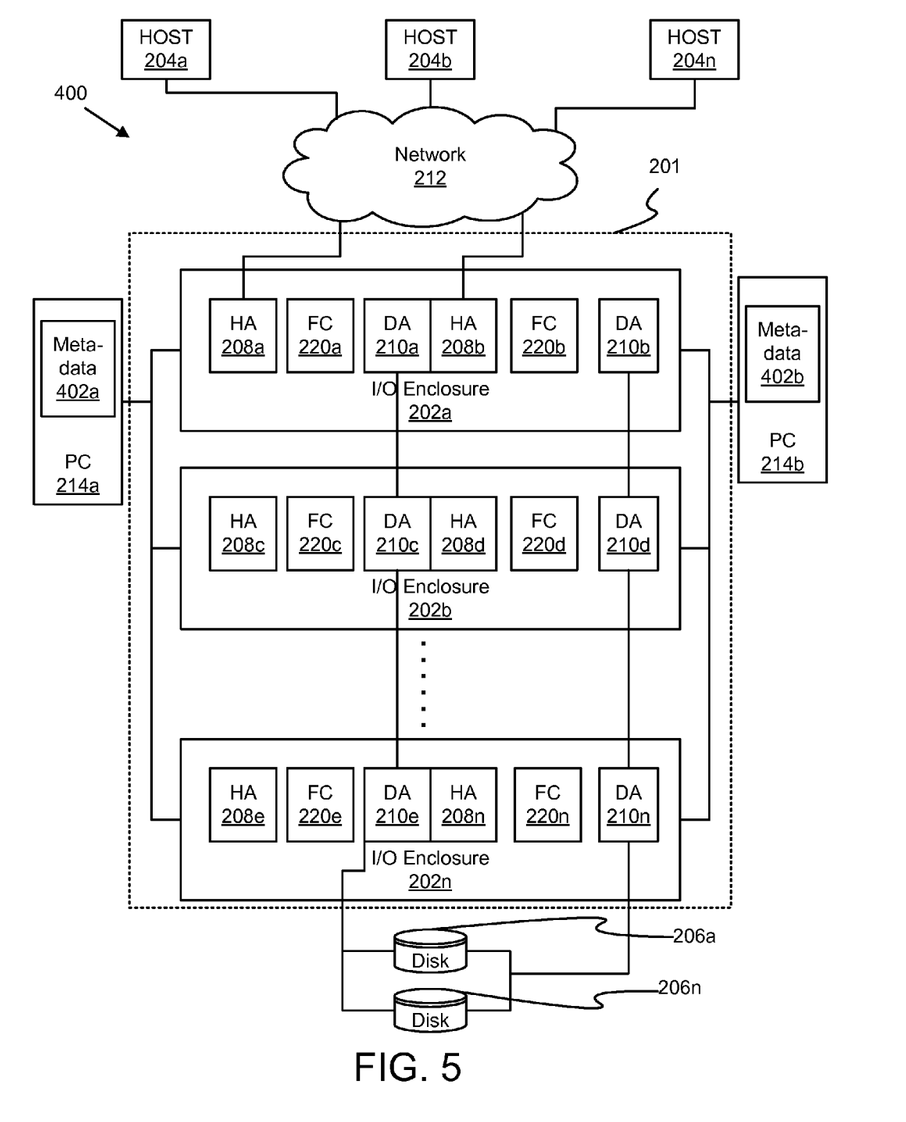
FIG. 5 is a schematic block diagram illustrating one embodiment of a storage system that exclusively utilizes an integrated flash-based cache in accordance with the present invention.

FIG. 5 is a schematic block diagram illustrating one embodiment of a storage system 400 that exclusively utilizes a flash cache 220a-n without a DRAM cache 216a-b or NVS cache 218a-b in accordance with the present invention. In the depicted embodiment, the DRAM cache 216a-b and NVS cache 218a-b of the previous embodiments are replaced by the flash caches 220a-n attached to the I/O enclosure module 201. In one embodiment, this architecture takes advantage of the presence of a peer-to-peer data transfer possibility among I/O enclosures 202a-n that enables the system 400 to write a second copy of data to a second flash cache 220c in another I/O enclosure 202b without consuming CPU cycles in the processor complex 214a and with using transfer bandwidth to the processor complex 214a.

In this embodiment, when a write request is received by the host adapter 208a, the host adapter 208a again asks the processor complex 214a for a location where the data should be moved. The possible locations may be stored as metadata 402a-b. A first target location is returned corresponding to a first flash cache 220a on a first I/O enclosure 202a, and a second target location is returned corresponding to a second flash cache 220c on a second I/O enclosure 202b. The host adapter 208a then transfers the write data to the two locations on the two different flash cache locations.

Later, the data may be de-staged to disks or moved to other regions in the flash cache 220a-n in manner similar to that described above with regard to other embodiments. Preferably, the processor complexes 214a-b may still maintain a store of metadata 402a-b associated with the flash cache 220a-n. In the event of a failure of the primary processor complex 214a, the metadata 402a-b may be dumped to the secondary primary complex 214b or to the flash cache 220a-n or both.

Figure 6:
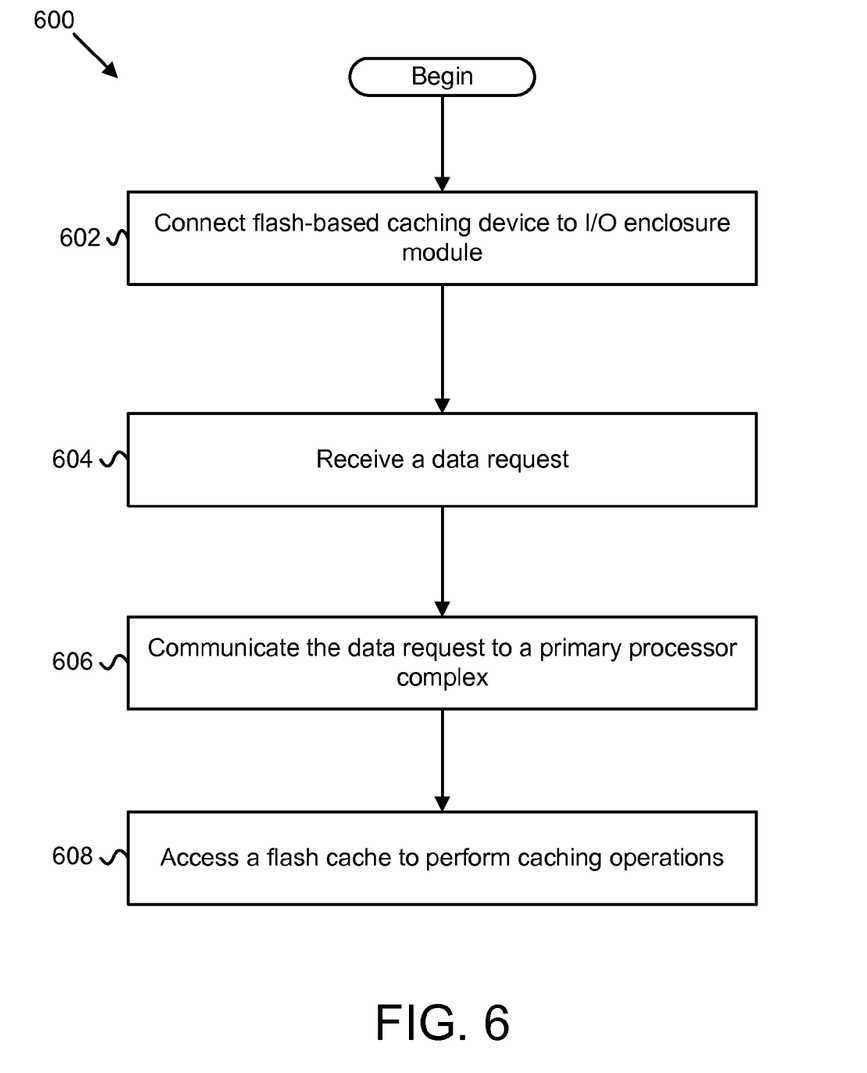
FIG. 6 is a schematic flow chart diagram illustrating one embodiment of a method for integrating a flash cache into a storage system in accordance with the present invention.

FIG. 6 is a schematic flow chart diagram illustrating one embodiment of a method 600 for integrating a flash cache 220a-n into a storage system in accordance with the present invention. The method 600 in the disclosed embodiments substantially includes the steps necessary to carry out the functions presented above with respect to the operation of the described apparatus and system.

The method 600 begins when at least one flash cache 220a-n is connected 602 to an I/O enclosure module 201. The flash cache 220a-n preferably includes a flash-based memory configured to cache data associated with data requests handled through the I/O enclosure module 201. The I/O enclosure module 201 includes one or more I/O enclosures 2021-n having a plurality of slots for receiving electronic devices.

A data request is received 604 by a host adapter 208a connected to a first slot of the I/O enclosure module 201. The host adapter is configured to connect a host 204a-n to the I/O enclosure module 201. The I/O enclosure module 201 has at least one device adapter 210a-n connected to a second slot of the I/O enclosure module 201. The device adapter is configured to connect a storage device 206a-n to the I/O enclosure module 201.

Next, the host adapter 208a communicates 606 the data request to a primary processor complex 214a that manages data requests handled through the I/O enclosure module. The primary processor complex 214a accesses 608 the flash cache to perform one or more caching operations associated with the data request. The flash cache 220a-n is connected to a third slot of the I/O enclosure module 201. In this manner, a storage system is able to integrate a flash based cache 220a-n.

In one embodiment, the data request is a read request, and accessing the at least one flash cache 220a-n to perform one or more caching operations includes retrieving data from the flash cache 220a-n. In another embodiment, the data request is a write request, accessing at least one flash cache 220a-n to perform one or more caching operations includes storing data associated with the write request in the flash cache 220a-n.

Figure 7:
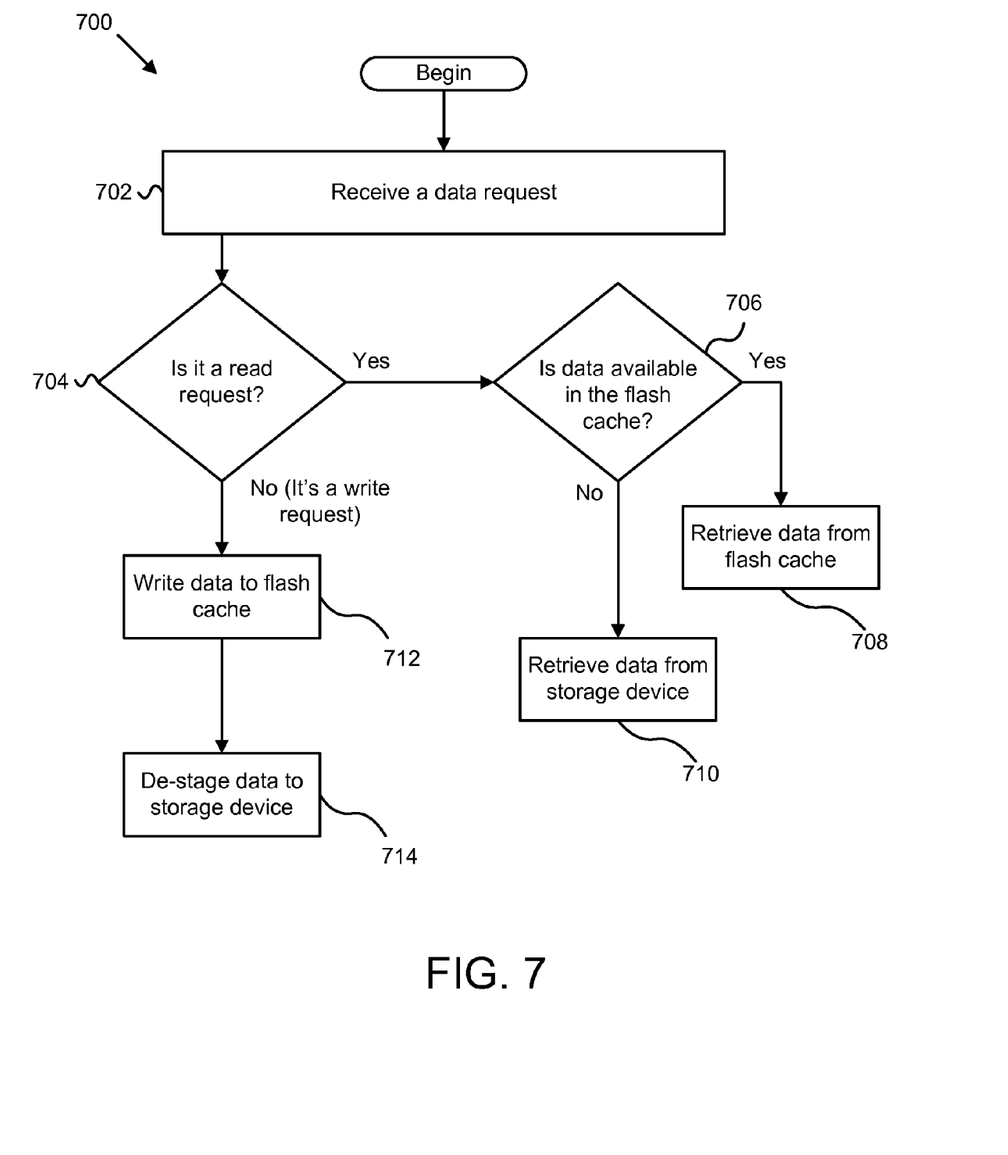
FIG. 7 is a schematic flow chart diagram illustrating one embodiment of a method for handling data requests in a storage system with a flash cache in accordance with the present invention.

FIG. 7 is a schematic flow chart diagram illustrating one embodiment of a method 700 for handling data requests including read and write requests in a storage system with a flash cache 220a-n in accordance with the present invention. The method 700 in the disclosed embodiments substantially includes the steps necessary to carry out the functions presented above with respect to the operation of the described apparatus and system.

The method 700 begins when the host adapter 208a receives 702 a data request from a host 204a-n. First, it is determined 704 if the data request is a read request. If the data request is a read request, it is next determined 706 if the data satisfying the read request is available in the flash cache 220a-n. If the data is available in the flash cache 220a-n, the data is retrieved 708 from the flash cache 220a-n, preferably without accessing any additional storage devices. If the data is not available in the flash cache 220a-n, the data is retrieved 710 from a storage device 206a-n. It is contemplated that data may also be retrieved in some embodiments from a volatile cache (e.g. DRAM cache 216a) or non-volatile cache (e.g. NVS cache 218a) associated with the processor complex 214a-b.

If it is determined 704 that the data request is not read request, but is a write request, then the data is cached 712 to a write region 302 of the flash cache 220a. In one embodiment, the data may first be written to a non-volatile DRAM cache 216a, and then be de-staged to the flash cache 220a. In a further embodiment, data written to the write region 302 of the flash cache 220a may be de-staged 714 to a storage device 206a-n. In this manner, data requests may be handled using a flash cache integrating into a storage system with minimal architectural changes. The method improves cache hit probability, and in some cases, reduces costs and increases the overall performance of the storage system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to integrate a flash-based cache into a storage system, the apparatus comprising:

an input/output ("I/O") enclosure having a plurality of slots for receiving host adapters and device adapters;

a host adapter placed into a first slot of the I/O enclosure such that the host adapter resides within an interior of the I/O enclosure, the host adapter configured to connect a host to the I/O enclosure;

a device adapter placed into a second slot of the I/O enclosure such that the device adapter resides within the interior of the I/O enclosure, the device adapter configured to connect a storage device to the I/O enclosure;

a flash-based caching device ("flash cache") placed into a third slot of the I/O enclosure such that the flash cache resides within the interior of the I/O enclosure, the flash cache comprising a flash-based memory configured to cache data associated with data requests handled through the I/O enclosure, wherein the flash cache is divided into regions comprising a read cache region that caches data associated with read data requests, a write cache region that caches data associated with write data requests, a supplemental read cache region that maintains a cache of data already de-staged to a storage device such that the data can be retrieved from the supplemental read cache region, and a store region that stores data that is not de-staged to a storage device such that the data can be retrieved from the store region;

a primary processor complex external to the I/O enclosure that manages data requests handled through the I/O enclosure, the primary processor complex communicating with the host adapter, the device adapter, and the flash cache to manage the data requests, the primary processor complex comprising a first dynamic random access memory ("DRAM") cache for temporarily caching data associated with data requests handled through the I/O enclosure, wherein the primary processor complex is configured to de-stage data cached in the first DRAM cache to the flash cache;

a secondary processor complex external to the I/O enclosure that acts as a secondary manager of data requests handled through the I/O enclosure, the secondary processor complex communicating with the host adapter, the device adapter, and the flash cache to manage the data requests in response to a failure of the primary processor complex, the secondary processor complex comprising a second DRAM cache for temporarily caching data associated with data requests handled through the I/O enclosure, wherein the secondary processor complex is configured to de-stage data cached in the second DRAM cache to the flash cache.

2. The apparatus of claim 1, wherein the primary processor complex further comprises a first non-volatile storage ("NVS") cache comprising a non-volatile memory device for caching data associated with data requests handled by the I/O enclosure, wherein the primary processor complex is configured to de-stage data cached in one of the first DRAM cache and the first NVS cache to the flash cache; and wherein the secondary processor complex further comprises a second non-volatile storage ("NVS") cache comprising a non-volatile memory device for caching data associated with data requests handled by the I/O enclosure, wherein the secondary processor complex is configured to de-stage data cached in one of the second DRAM cache and the second NVS cache to the flash cache.

* * * * *